United States Patent
Gorval et al.

(10) Patent No.: US 12,228,036 B2
(45) Date of Patent: Feb. 18, 2025

(54) AMMONIA SYNTHESIS DEVICE

(71) Applicants: thyssenkrupp Uhde GmbH, Dortmund (DE); thyssenkrupp AG, Essen (DE)

(72) Inventors: Evgeni Gorval, Dortmund (DE); Bernd Mielke, Witten (DE)

(73) Assignees: thyssenkrupp Uhde GmbH, Dortmund (DE); thyssenkrupp AG, Essen (DE)

( * ) Notice: Subject to any disclaimer, the term of this patent is extended or adjusted under 35 U.S.C. 154(b) by 0 days.

(21) Appl. No.: 18/692,679

(22) PCT Filed: Sep. 15, 2022

(86) PCT No.: PCT/EP2022/075601
§ 371 (c)(1),
(2) Date: Mar. 15, 2024

(87) PCT Pub. No.: WO2023/041619
PCT Pub. Date: Mar. 23, 2023

(65) Prior Publication Data
US 2024/0426224 A1  Dec. 26, 2024

(30) Foreign Application Priority Data

Sep. 16, 2021 (BE) ................................... 2021/5727
Sep. 16, 2021 (DE) ..................... 10 2021 210 249.2

(51) Int. Cl.
*F01D 15/10* (2006.01)
*C01C 1/04* (2006.01)
(Continued)

(52) U.S. Cl.
CPC ............ *F01D 15/10* (2013.01); *C01C 1/0405* (2013.01); *F01D 19/00* (2013.01); *F01D 25/10* (2013.01); *F05D 2260/213* (2013.01)

(58) Field of Classification Search
CPC .......... F01D 15/10; F01D 19/00; F01D 25/10; F01D 25/12; F05D 2260/213;
(Continued)

(56) References Cited

U.S. PATENT DOCUMENTS 11,512,402 B2 * 11/2022 Bairamijamal ......... C07C 41/01
11,719,134 B2 *  8/2023 Huntington ............. F01K 7/165
                                                                60/645
(Continued)

FOREIGN PATENT DOCUMENTS

DE  102018006330 A1  2/2020
EP      3730456 A1   10/2020
WO   2021105060 A1   6/2021

OTHER PUBLICATIONS

English Translation of International Search Report issued in PCT/EP2022/075601, dated Nov. 14, 2022.

*Primary Examiner* — Dapinder Singh
(74) *Attorney, Agent, or Firm* — thyssenkrupp North America, LLC

(57) ABSTRACT

The present disclosure relates to an ammonia plant, wherein the ammonia plant comprises a converter, a first heat exchanger, and a removal apparatus. The converter and the first heat exchanger are connected to one another via a product gas connection in such a way that the ammonia synthesis product gas is guided out of the converter via the first heat exchanger to the removal apparatus. The removal apparatus and the converter are connected to one another via a reactant gas connection in such a way that the circulation gas is guided from the removal apparatus to the converter. The ammonia plant comprises a hydrogen feed that is connected to the converter via a second heat exchanger. The ammonia plant comprises a first electric heater and a steam turbine. The first electric heater is connected to the converter or to the steam turbine.

8 Claims, 1 Drawing Sheet

(51) Int. Cl.
*F01D 19/00* (2006.01)
*F01D 25/10* (2006.01)

(58) Field of Classification Search
CPC ... C01C 1/0405; C01C 1/0447; C01C 1/0411;
C01C 1/04; C01C 1/026; C01C 1/0488
See application file for complete search history.

(56) References Cited

U.S. PATENT DOCUMENTS

| | | |
|---|---|---|
| 2002/0090329 A1 | 7/2002 | Ternan |
| 2002/0098129 A1 | 7/2002 | Martin et al. |
| 2004/0219088 A1 | 11/2004 | Wen et al. |
| 2011/0123404 A1 | 5/2011 | Rizzi et al. |
| 2011/0219773 A1* | 9/2011 | Gerrish ..................... F02C 3/20 |
| | | 204/278 |
| 2016/0145113 A1* | 5/2016 | Andersen ............. B01J 19/0013 |
| | | 422/162 |
| 2016/0288114 A1* | 10/2016 | Way ........................ B01J 23/50 |

* cited by examiner

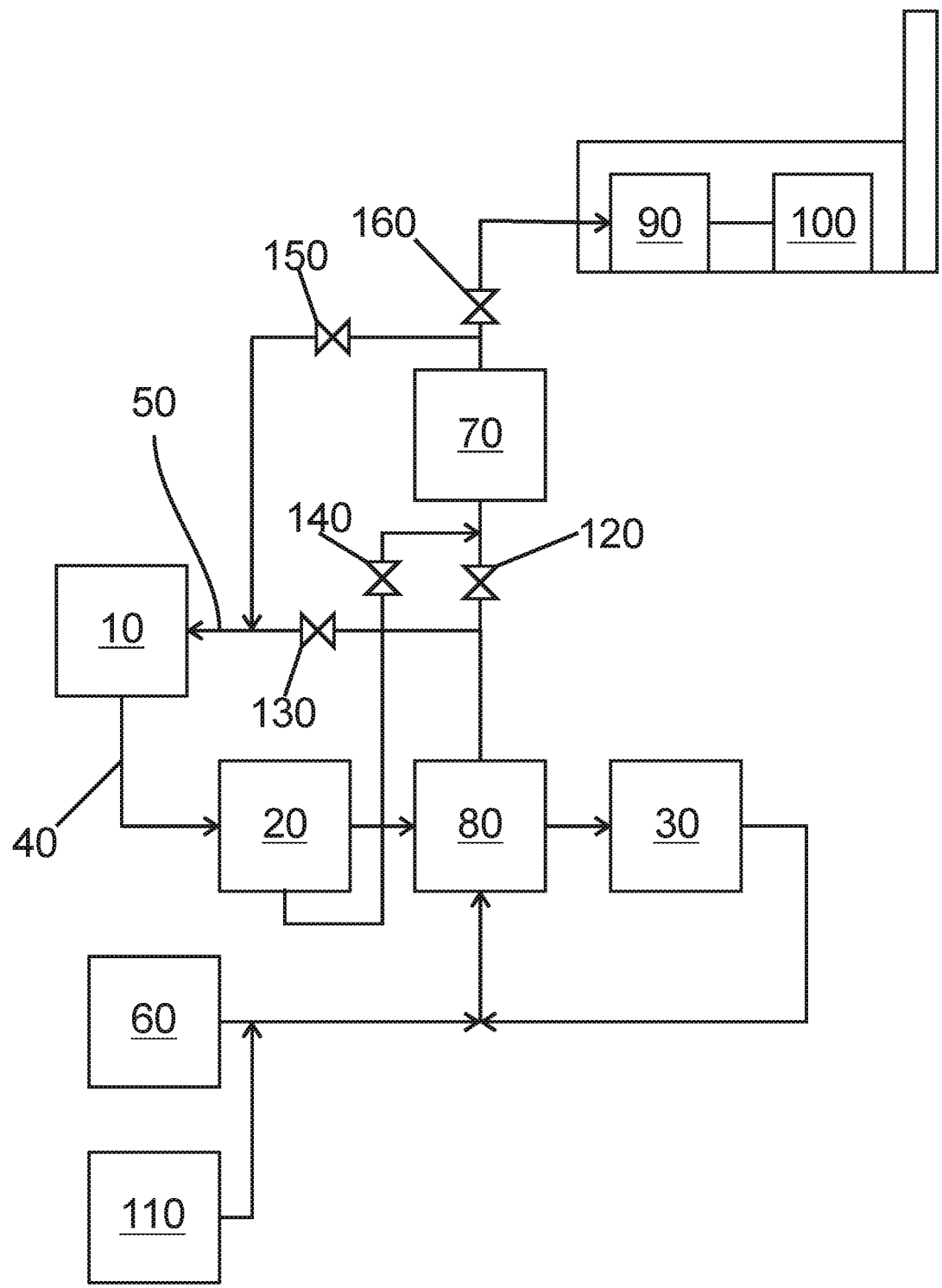

AMMONIA SYNTHESIS DEVICE

CROSS REFERENCE TO RELATED APPLICATIONS

This application is a U.S. National Stage Entry of International Patent Application Serial Number PCT/EP2022/075601, filed Sep. 15, 2022, which claims priority to German Patent Application No. DE 10 2021 210 249.2, filed Sep. 16, 2021, and Belgian Patent Application No. BE 2021/5727, filed Sep. 16, 2021, the entire contents of which are incorporated herein by reference.

FIELD

The present disclosure generally relates to an apparatus and process for synthesizing ammonia.

BACKGROUND

At present, for ammonia synthesis hydrogen is mainly produced from natural gas via steam reforming and a water-gas shift reaction. Since methane ($CH_4$) is converted into hydrogen ($H_2$) and carbon dioxide ($CO_2$), this results in significant emission of carbon dioxide. To reduce this, use is increasingly being made of hydrogen from other sources, for example of the electrolysis of water by means of renewably generated power. However, this leads to further changes in the overall process, since natural gas as fuel gas source and also the comparatively high combustion temperatures in the overall process are then no longer available. This applies by way of example and in particular to the start-up of the apparatus, where it is necessary to first bring the reactant gases to a temperature needed for the ammonia synthesis before the overall process can be maintained by the exothermic reaction.

US 2004/0219088 A1 discloses a mini ammonia plant.

EP 3 730 456 A1 discloses the use of renewable energy in ammonia synthesis.

US 2002/0098129 A1 discloses an apparatus for heating a catalyst.

US 2002/0090329 A1 discloses a hydrogen-generating apparatus.

A further point is that, in the course of the cooling of the product gas stream after ammonia synthesis, saturated water vapor is produced, for example at 330° C. at approximately 130 bar, which however has only limited usability. This saturated steam has hitherto been superheated to approximately 535° C. with the aid of the combustion of natural gas, for example when utilizing waste heat from steam reforming, and can then for example be used to generate power or to drive the turbines of the compressors.

Thus a need exists to solve the technical challenges that arise when steam reforming is omitted.

BRIEF DESCRIPTION OF THE FIGURES

FIG. 1 is a schematic illustration of an ammonia plant according to examples of the present disclosure.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The ammonia plant according to the invention comprises a converter, a first heat exchanger and a removal apparatus. Hydrogen and nitrogen are converted into ammonia in the converter. Since, however, this is an equilibrium reaction, the ammonia synthesis product gas also contains the reactants hydrogen and nitrogen in addition to the product ammonia. The converter and the first heat exchanger are connected to one another via a product gas connection in such a way that the ammonia synthesis product gas is guided out of the converter via the first heat exchanger to the removal apparatus. In the removal apparatus, the product ammonia is at least partially removed from the ammonia synthesis product gas, leaving behind unconverted reactants and any unremoved product, i.e. a hydrogen-nitrogen-ammonia mixture which is referred to as circulation gas. The removal apparatus and the converter are connected to one another via a reactant gas connection in such a way that the circulation gas is guided from the removal apparatus to the converter. This set-up corresponds to the conventional circuit within the Haber-Bosch process.

The ammonia plant comprises a hydrogen feed that is connected to a hydrogen source. By way of example, the hydrogen feed may be connected to a hydrogen supply network. Likewise, the hydrogen feed may be connected to a water electrolysis apparatus (water electrolysis).

If the hydrogen source only provides hydrogen, such as in the case of a water electrolysis apparatus, and not a hydrogen-nitrogen mixture, such as in the case of a steam reforming apparatus (steam reforming), the ammonia plant thus preferably also comprises an air fractionation apparatus (air fractionation), the nitrogen from the air fractionation apparatus being mixed with the hydrogen from the hydrogen feed before the gas mixture is compressed, heated and finally converted into ammonia in the converter.

The hydrogen feed is connected to the converter via a second heat exchanger. The second heat exchanger brings the ammonia synthesis product gas to the temperature of approximately 350° C. to 400° C. that is needed for the reaction.

According to the invention, the ammonia plant comprises an electric heater, the first electric heater. The ammonia plant further comprises a steam turbine, for example to generate power or to drive the compressors. The first electric heater is connectable to the converter or to the steam turbine. "Connectable" means that the first electric heater is connected to the converter during start-up and that the first electric heater is connected to the steam turbine in continuous regular operation. Consequently, the ammonia plant is thus in particular configured such that the first electric heater is connected to the converter during start-up and is connected to the steam turbine during continuous regular operation. This includes a configuration in which the first electric heater is connected to the converter and is also connected to the steam turbine, where the medium to be heated may be conducted electively via these connections (the connections may feed in a switchable manner). The "connectable" property is therefore preferably realized by valves such that either during start-up a hydrogen-nitrogen mixture (with increasing ammonia content during start-up) can be fed from the second heat exchanger to the first electric heater, can be heated there and is then fed to the converter, or during regular operation steam can be fed from the first heat exchanger to the first electric heater, can be superheated there and can then be conducted to the steam turbine.

In addition to the first electric heater, an ammonia plant according to the invention may also comprise further electric heaters.

The first heat exchanger may also have a cascaded construction, that is to say consist for example of a first heat exchanger and a further first heat exchanger.

In a further embodiment of the invention, the first heat exchanger is connectable to the first electric heater in such a way that the water vapor generated in the first heat exchanger is guided into the first electric heater.

In a further embodiment of the invention, the second heat exchanger is connected to the converter in such a way that the reactant gas stream is guided from the second heat exchanger into the converter in a switchable manner directly or via the first electric heater.

In a further embodiment of the invention, the steam turbine is connected to a generator for power generation.

In a further alternative embodiment of the invention, the steam turbine is connected to a compressor.

In a further aspect, the invention relates to a process for starting up and operating an ammonia plant according to the invention. During start-up the first electric heater heats the reactant stream flowing to the converter. After start-up, in regular operation, the first electric heater superheats steam from the first heat exchanger, and the superheated water vapor is conducted to the steam turbine.

The ammonia plant according to the invention is described in more detail below with reference to an exemplary embodiment illustrated in the drawing.

FIG. 1 Schematic illustration of an ammonia plant

FIG. 1 schematically illustrates an ammonia plant according to the invention. Hydrogen is supplied from a hydrogen feed 60; for example, the hydrogen feed 60 can be fed from a hydrogen network or from a water electrolysis apparatus. Nitrogen is required as the second reactant, this nitrogen being provided by means of an air fractionation apparatus 110. These reactants are guided together into a second heat exchanger 80 and heated there by the product gas stream coming out of the converter 10. It is from this point that the guiding differs between start-up and regular operation.

In regular operation, the first valve 120 is closed and the second valve 130 is open. As a result, the reactant gas stream heated to reaction temperature by the second heat exchanger 80 is fed directly to the converter 10 via a reactant gas connection 50. To this end, the reactant gas stream passes through the open second valve 130; the first valve 120 is closed. The conversion of hydrogen and nitrogen into ammonia is effected in the converter 10, heating the gas mixture. The product gas stream is conducted out of the converter 10 via a product gas connection 40 firstly into a first heat exchanger 20 and here gives off some of the heat generated in the reaction. The product gas stream is then conducted from the first heat exchanger 20 into the second heat exchanger 80, where said stream gives off more heat to the reactant gas stream. Once cooled, the product gas stream is then conducted into the removal apparatus 30, where the product ammonia is separated off. Further heat exchangers may be arranged upstream of the removal apparatus 30 in order to further cool the gas mixture for the purpose of better removal. From the removal apparatus 30, the gas mixture, which comprises mainly hydrogen and nitrogen and possibly ammonia, is put back into the circuit, the removal apparatus 30 being connected to the second heat exchanger 80 for this purpose. Upstream of the second heat exchanger 80, the gas streams from the removal apparatus 30 are combined with the hydrogen from the hydrogen feed 60 and the nitrogen from the air fractionation apparatus 110. These two gas streams may each be individually compressed here by two compressors preferably before they are combined, in order to reach the pressure needed for the Haber-Bosch process. A common compression is less preferred since the two gas streams have very different input pressures. The reactants, the hydrogen from the hydrogen feed 60 and the nitrogen from the air fractionation apparatus 110, may be conducted directly to or immediately upstream of the removal apparatus 30 for combination with the product stream. This is particularly preferred when the reactant streams comprise the residual water, this being washed out in the removal apparatus 30 together with the removed ammonia.

In addition to this circuit for synthesizing the ammonia, the steam generated in the first heat exchanger 20 (saturated steam with for example a temperature of 330° C. and a pressure of approximately 130 bar) is conducted through the open third valve 140 into the first electric heater 70 and heated there from for example approximately 330° C. to for example 500° C. to 550° C. When the fourth valve 150 is closed, the steam is guided via the open fifth valve 160 to the steam turbine 90 which in the example illustrated drives a generator 100. As an alternative, said turbine may also drive a compressor or multiple compressors.

The start-up of the ammonia plant differs significantly from this regular operation: The third valve 140 and the fifth valve 160 are closed; no steam is conducted to the steam turbine 90. Furthermore, the second valve 130 is also closed, meaning that the first valve 120 and the fourth valve 150 are open. As a result, the reactants from the hydrogen feed 60 and the air fractionation apparatus 110 are now guided via the second heat exchanger 80 firstly into the first electric heater 70, heated there and conducted from there into the converter 10. This procedure is performed until the converter 10 is sufficiently hot, so that the reaction runs to a sufficient extent and generates sufficient energy itself. Then, the second valve 130 is opened and the first valve 120 and the fourth valve 150 are closed. Furthermore, when the reaction accelerates further, the third valve 140 and the fifth valve 160 are opened, and water or water vapor are conducted into the first heat exchanger 20, heated there to for example 330° C., then conducted into the first electric heater 70, heated there for example to 525° C. and from there conducted to the steam turbine 90, which in turn drives the generator 100 with the energy and generates power which is partly required for the first electric heater 70. As an alternative, the steam turbine 90 may also drive a compressor or multiple compressors.

Since the first electric heater 70 is thus exposed to two different media, a rinsing procedure May be provided between the two operating states that have been shown so far. By way of example, the first valve 120 and/or the third valve 140 may be designed as a three-way valve, where the third connection may for example be connected to the air fractionation apparatus 110 in order to introduce nitrogen as rinsing fluid. Equally, in addition or as an alternative, the fourth valve 150 and/or the fifth valve 160 may also be designed as a three-way valve, where the third connection is for example connected to a pump in order to quickly remove the volume of gas in the first electric heater 70.

LIST OF REFERENCE NUMERALS

10 converter
20 first heat exchanger
30 removal apparatus
40 product gas connection (with product gas stream)
50 reactant gas connection (with reactant gas stream)
60 hydrogen feed
70 first electric heater
80 second heat exchanger
90 steam turbine
100 generator
110 air fractionation apparatus
120 first valve
130 second valve
140 third valve
150 fourth valve
160 fifth valve

What is claimed is:

1. An ammonia plant comprising:
    a converter;
    a first heat exchanger;
    a second heat exchanger;
    a removal apparatus;
    a product gas connection that connects the converter and the first heat exchanger in such a way that an ammonia synthesis product gas is guided out of the converter via the first heat exchanger to the removal apparatus;
    a reactant gas connection that connects the removal apparatus and the converter in such a way that a circulation gas is guided from the removal apparatus to the converter;
    a hydrogen feed connected to the converter via the second heat exchanger; and
    a first electric heater, wherein the ammonia plant comprises a steam turbine, wherein the first electric heater is connected to one of the converter and the steam turbine.

2. The ammonia plant as claimed in claim 1, wherein the first heat exchanger is connected to the first electric heater in such a way that the water vapor generated in the first heat exchanger is guided into the first electric heater.

3. The ammonia plant as claimed in claim 1 wherein the second heat exchanger is connected to the converter in such a way that the reactant gas stream is guided from the second heat exchanger into the converter in a switchable manner one of directly and via the first electric heater.

4. The ammonia plant as claimed in claim 1 wherein the steam turbine is connected to a generator for power generation.

5. The ammonia plant as claimed in claim 1, wherein the steam turbine is connected to a compressor.

6. The ammonia plant of claim 1 wherein the first electric heater is connected to the converter.

7. The ammonia plant of claim 1 wherein the first electric heater is connected to the steam turbine.

8. A process for starting up and operating an ammonia plant as claimed in claim 1, the process comprising:
    during start-up, heating, via the first electric heater, the reactant stream flowing to the converter, and
    after start-up, in regular operation, superheating, via the first electric heater, steam from the first heat exchanger and conducting the superheated water vapor to the steam turbine.

* * * * *